UNITED STATES PATENT OFFICE.

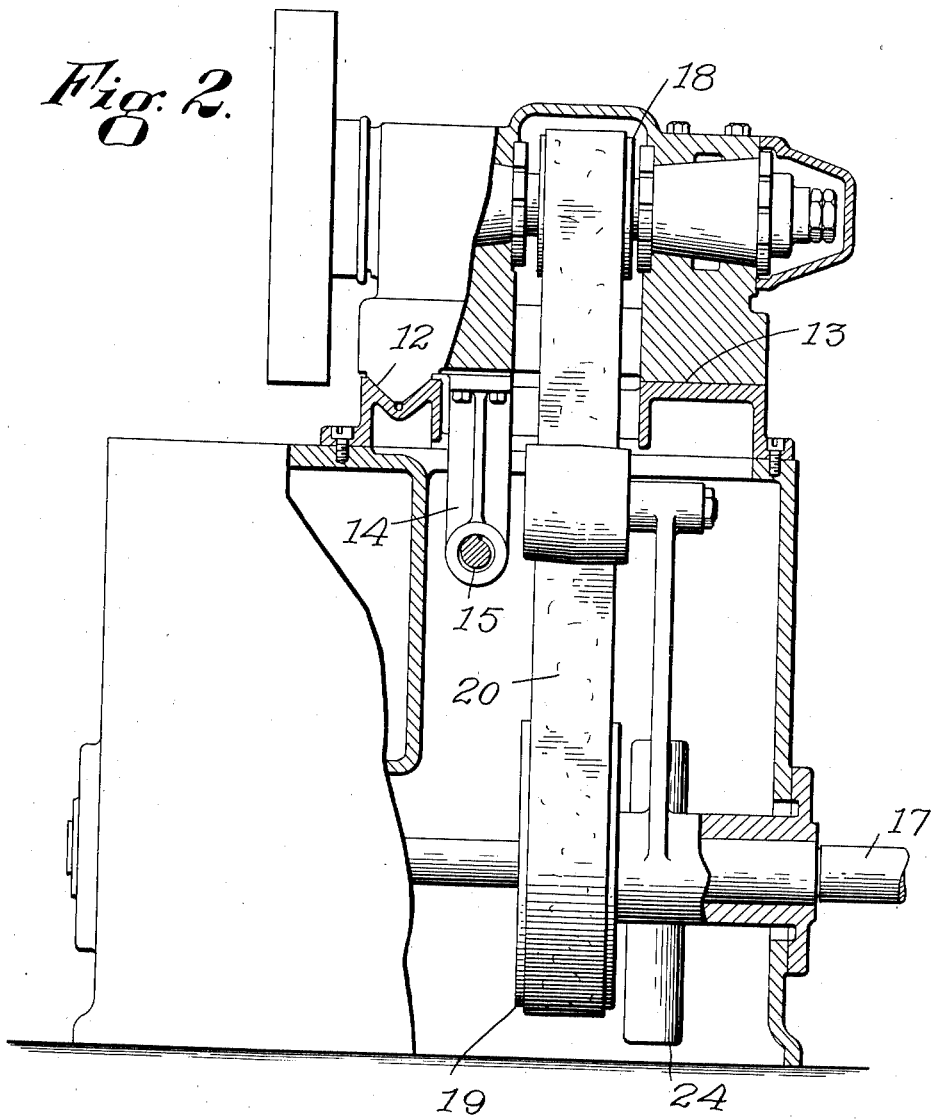

JOSEPH WILCOX, JR., OF FITCHBURG, MASSACHUSETTS.

BELT-DRIVE FOR GRINDING-MACHINES.

1,334,339.      Specification of Letters Patent.      Patented Mar. 23, 1920.

Application filed April 9, 1919. Serial No. 288,801.

*To all whom it may concern:*

Be it known that I, JOSEPH WILCOX, Jr., a citizen of the United States, residing at Fitchburg, in the county of Worcester and State of Massachusetts, have invented a new and useful Belt-Drive for Grinding-Machines, of which the following is a specification.

This invention relates to a grinding machine of the type in which the wheel spindle is mounted in a cross slide and is belt-driven from a power shaft having fixed bearings in the machine frame. As the wheel slide is moved forward and rearward the distance between the shaft centers varies, and special provision is necessary for adapting the belt to these varying working conditions.

It is the object of my present invention to provide improved and simplified devices in a belt drive, effective to tension the belt, preferably in both runs thereof, and readily permitting changes in distance between the shaft centers.

In the preferred form, I provide an arm or support angularly movable about the axis of the power shaft, this arm supporting a pair of drive pulleys each of which engages one run of the belt upon the front side thereof.

Suitable means is provided for drawing the arm and guide pulleys rearwardly to tension the belt. As the arm is supported independently of the wheel slide, this arrangement also indirectly effects a rearward pressure through the belt on the wheel slide, thus eliminating backlash in the cross feed.

A preferred form of my invention is shown in the drawings, in which

Fig. 2 is a front view thereof, partly in section, taken along the line 2—2 in Fig. 1.

Figure 1:
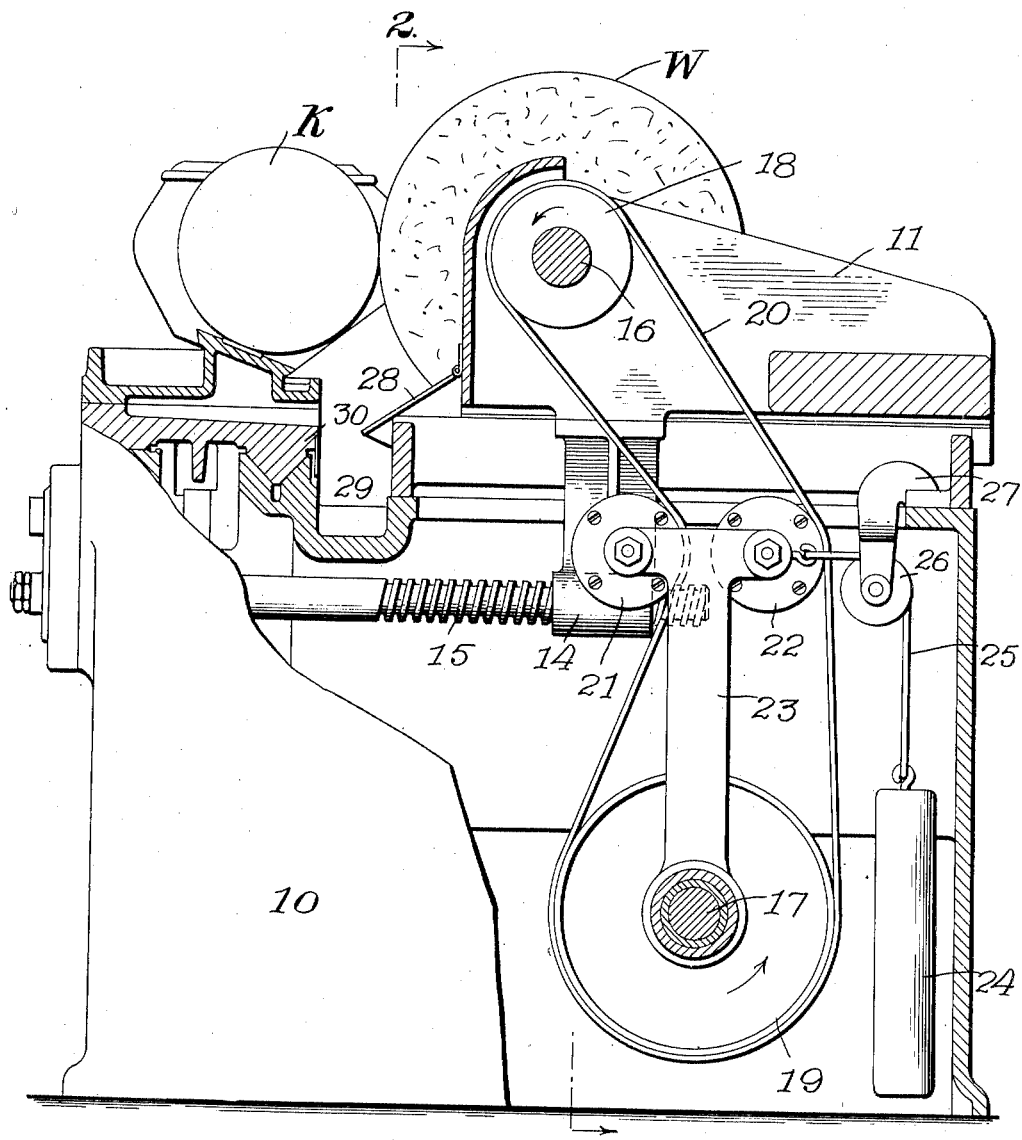
Figure 1 shows my improved belt drive in side elevation.

Referring to the drawing, I have shown a frame 10 upon which a wheel slide 11 is suitably guided in ways 12 and 13. A threaded bearing or nut 14 extends downward from the wheel slide and is engaged by the cross feed screw 15. The wheel W is mounted on a wheel shaft 16 rotatable in bearings in the wheel slide, and a power shaft 17 is mounted in bearings in the lower part of the frame 10. The shafts 16 and 17 are provided with suitable pulleys 18 and 19, and are connected by a belt 20.

Guide pulleys 21 and 22 engage the two runs of the belt 20 on the forward side thereof, these guide pulleys being mounted upon an arm 23 supported for free angular movement about the axis of the shaft 17. The arm 23 is preferably freely mounted upon the outside of one of the bearings of the shaft 17.

A heavy weight 24 is connected by a flexible member 25 with the upper end of the arm 23, the member 25 passing over a guide pulley 26 which changes its direction of motion. The pulley 26 is supported by a bracket 27 secured to the frame 10.

A cover plate 28 is hinged to the front end of the wheel slide 11, and covers the front ends of the ways 12 and 13, as the wheel slide moves backward. As the slide moves forward, the plate 28 swings downward into a recess 29 in the frame 10, thus clearing the table 30 upon which the work K is rotatably supported.

With this arrangement of parts, it will be seen that the single weight 24 applies tension to both runs of the belt 20, and also permits the arm 23 to swing forward or rearward to compensate for changes in distance between the centers of the shafts 16 and 17 without materially changing the tension upon the belt. Furthermore the weight 24 acting through the belt 20 applies indirect rearward pressure to the wheel slide 11, thus eliminating backlash in the cross feed mechanism. The operation of the plate 28 during the forward and rearward movements of the wheel slide has been already described.

The belt drive herein shown is simple and efficient and applies a substantially constant tension to the belt 20 in every position of the wheel slide, also permitting a wide range of movement of the slide.

Having thus described my invention, it will be evident that changes and modifications can be made therein by those skilled in the art without departing from the spirit and scope thereof as set forth in the claims, and I do not wish to be otherwise limited to the details herein disclosed, but what I claim is—

1. In a grinding machine, a frame, a wheel slide, a wheel shaft supported thereon, feeding means for said wheel slide, a power shaft rotatable in fixed bearings, pulleys on said shafts, a belt on said pulleys, and means to tension both runs of said belt and to also exert indirect rearward pressure on said slide effective to eliminate back lash between said feeding means and said slide.

2. In a grinding machine, a frame, a wheel slide, a wheel shaft supported thereon, feeding means for said wheel slide, a power shaft rotatable in bearings in said frame, pulleys on said shafts, a belt on said pulleys, an arm mounted to swing about the axis of said power shaft, belt guiding means on said arm, and means to swing said arm rearwardly to tension said belt and to apply indirect rearward pressure to said slide effective to eliminate back lash between said feeding means and said slide.

3. In a grinding machine, a frame, a wheel slide, a wheel shaft supported thereon, feeding means for said wheel slide, a power shaft rotatable in bearings in said frame, pulleys on said shafts, a belt on said pulleys, a pair of guide pulleys each engaging one run of said belt, a single support for said pulleys movably mounted independently of said wheel slide, and means to move said support rearwardly and to continuously exert substantially uniform tension on said belt as said wheel slide is moved by said feeding means.

4. In a grinding machine, a frame, a wheel slide, a wheel shaft supported thereon, a power shaft rotatable in bearings in said frame, pulleys on said shafts, a belt on said pulleys, an arm mounted to swing about the axis of said power shaft, a pair of guide pulleys fixed to said arm, and yielding means to swing said arm rearwardly to exert substantially uniform tension on both runs of said belt as said wheel slide is moved by said feeding means.

5. In a grinding machine, a frame, a wheel slide, a wheel shaft supported thereon, feeding means for said wheel slide, a power shaft rotatable in said frame, pulleys on said shafts, a belt on said pulleys, a pair of guide pulleys movably mounted independently of said slide, and each engaging one run of said belt on its forward side, and a single means effective to draw both of said pulleys rearwardly and to exert indirect rearward pressure on said wheel slide effective to eliminate back lash between said feeding means and said slide.

6. In a grinding machine, a frame, a wheel slide, a wheel shaft supported thereon, feeding means for said wheel slide, a power shaft rotatable in bearings in said frame, pulleys on said shaft, a belt on said pulleys, an arm movable about the axis of said power shaft, a pair of guide pulleys each engaging one run of said belt on its forward side, and a weight connected to said arm and exerting direct rearward tension on both runs of said belt and indirect tension on said wheel slide effective to eliminate back lash between said feeding means and said slide.

7. In a grinding machine, a frame, a work table, a wheel slide movable on ways toward and from said work table, and a protecting device mounted on said wheel slide and covering said ways as said slide moves rearward, said device being received in a recess in said frame below the table and ways as the slide moves forward.

8. In a grinding machine, a frame, a work table, a wheel slide movable on ways toward and from said work table, and a plate pivoted to the front end of said wheel slide and covering said ways as the slide moves rearwardly, the free end of said plate moving downward into a recess in said frame below the level of the table and ways as said slide moves forward.

In testimony whereof I have hereunto affixed my signature.

JOSEPH WILCOX, Jr. [L. S.]